D. L. TOWSLEE.
Drag-Sawing Machine.
No. 218,798.   Patented Aug. 19, 1879.
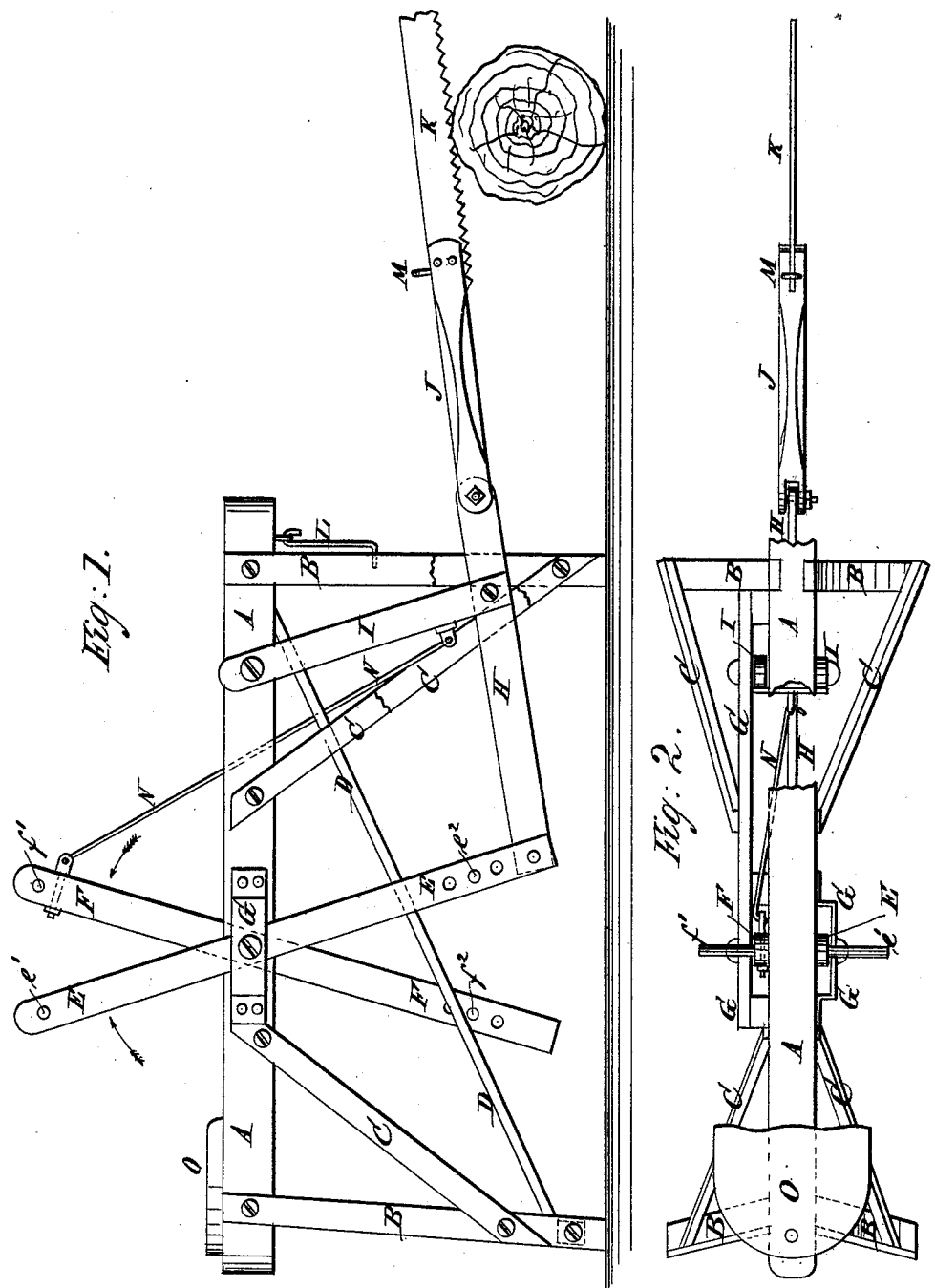
WITNESSES:
Achilles Schehl.
C. Sedgwick
INVENTOR:
D. L. Towslee
BY Munn & Co.
ATTORNEYS.

UNITED STATES PATENT OFFICE.

DAVID L. TOWSLEE, OF WEST SALEM, OHIO.

IMPROVEMENT IN DRAG-SAWING MACHINES.

Specification forming part of Letters Patent No. 218,798, dated August 19, 1879; application filed July 7, 1879.

*To all whom it may concern:*

Be it known that I, DAVID LORENZO TOWSLEE, of West Salem, in the county of Wayne and State of Ohio, (residence Harrisville township, Medina county, Ohio,) have invented a new and useful Improvement in Drag-Sawing Machines, of which the following is a specification.

Figure 1 is a side view of my improved machine, part being broken away to show the construction. Fig. 2 is a top view of the same, part being broken away to show the construction.

The object of this invention is to furnish an improved machine which shall be so constructed that it may be worked by the operator with both hands and feet, or with either his hands or his feet, and which shall be simple in construction, easily operated, and effective in operation, doing its work rapidly.

The invention consists in the combination of the levers, provided with the hand-pins and the foot-pins, the balance-bar, the swinging supporting-bars, the saw-holder, the connecting-rod, and the brace and guide bar, with each other and with the frame, as hereinafter fully described.

Similar letters of reference indicate corresponding parts.

A represents a bar, to the opposite sides of the end parts of which are attached two pairs of legs, B. The legs B incline outward like the legs of an ordinary saw-horse, and are strengthened by inclined braces C, attached to them and to the bar A. The frame is further strengthened by the bar D, the forward end of which is attached to the lower side of the forward end of the bar A, and its lower end is attached to the bar that connects the lower parts of the rear legs, B.

The inclined bar D also serves as a guide to the levers E F, which are pivoted to the opposite side edges of the bar A, and which are kept in place by keepers G, attached to the said bar A.

To the upper ends of the levers E F are attached pins $e^1 f^1$, for the operator to take hold of when operating the saw.

To the lower parts of the levers E F are attached pins $e^2 f^2$, for the operator to place his feet upon when operating the saw, so that he may work the saw with both his hands and feet, or with his hands alone, or with his feet alone, as he may wish. Several holes are formed in the levers E F to receive the pins $e^1 f^1 e^2 f^2$, so that they may be adjusted as the length of the arms and legs of the operator may require.

To the lower end of the lever E is pivoted the rear end of a bar, H, which is made heavy to serve as a balance-bar, and the forward part of which is supported by the swinging bars I. The lower ends of the bars I are pivoted to the opposite sides of the forward part of the balance-bar H, and their upper ends are pivoted to the opposite sides of the main bar A.

To the forward end of the balance-bar H is hinged the rear end of the bar J, to the forward end of which is rigidly attached the rear end of the saw K, so that the saw-holder J and the saw K can be turned up into an upright position at the forward end of the bar A when adjusting the log, and when moving from place to place.

The saw-holder and saw J K are supported when in an erect position by a hook, L, pivoted to the forward end of the bar A, and which is hooked into a staple or eye, M, attached to the forward end of the holder J.

To the upper end of the lever F is pivoted the upper end of the connecting-rod N, the lower end of which is pivoted to the lower part of the swinging bars I. With this construction the saw will be pushed forward by the movement of one foot and hand, and drawn back by the movement of the other foot and hand, the weight of the balance-bar H and of the swinging bars I assisting in starting the return movement.

O is the operator's seat, which is attached to the rear part of the bar A.

Having thus fully described my invention, I claim as new and desire to secure by Letters Patent—

The combination of the levers E F, provided with the hand-pins $e^1 f^1$ and the foot-pins $e^2 f^2$, the balance-bar H, the swinging supporting-bars I, the saw-holder J, the connecting-rod N, and the brace and guide bar D, with each other and with the frame A B C, substantially as herein shown and described.

DAVID LORENZO TOWSLEE.

Witnesses:
O. F. VAN OSDALL,
WM. GILLASPY.